US008805889B2

(12) United States Patent
Preslan et al.

(10) Patent No.: US 8,805,889 B2
(45) Date of Patent: *Aug. 12, 2014

(54) METADATA STRUCTURES AND RELATED LOCKING TECHNIQUES TO IMPROVE PERFORMANCE AND SCALABILITY IN A CLUSTER FILE SYSTEM

(75) Inventors: Kenneth Preslan, Minneapolis, MN (US); Michael J. Declerk, El Cerrito, CA (US); Matthew O'Keefe, Plymouth, MN (US)

(73) Assignee: Red Hat, Inc., Raleigh, NC (US)

( * ) Notice: Subject to any disclaimer, the term of this patent is extended or adjusted under 35 U.S.C. 154(b) by 669 days.

This patent is subject to a terminal disclaimer.

(21) Appl. No.: 12/345,217

(22) Filed: Dec. 29, 2008

(65) Prior Publication Data

US 2009/0119304 A1   May 7, 2009

Related U.S. Application Data

(60) Division of application No. 11/026,270, filed on Dec. 30, 2004, now Pat. No. 7,487,228, which is a continuation-in-part of application No. 10/355,786, filed on Jan. 30, 2003, now Pat. No. 7,406,473.

(60) Provisional application No. 60/352,822, filed on Jan. 30, 2002.

(51) Int. Cl.
 *G06F 17/30* (2006.01)
(52) U.S. Cl.
 USPC .......................................................... 707/800
(58) Field of Classification Search
 None
 See application file for complete search history.

(56) References Cited

U.S. PATENT DOCUMENTS

| 5,414,840 | A | * | 5/1995 | Rengarajan et al. ................... 1/1 |
| 5,987,477 | A | * | 11/1999 | Schmuck et al. ..................... 1/1 |
| 6,032,216 | A | | 2/2000 | Schmuck et al. |
| 6,173,293 | B1 | * | 1/2001 | Thekkath et al. ................. 707/1 |
| 6,493,804 | B1 | | 12/2002 | Soltis et al. |
| 6,782,389 | B1 | * | 8/2004 | Chrin et al. ..................... 707/10 |
| 6,832,248 | B1 | * | 12/2004 | Byrnes .......................... 709/223 |
| 6,862,248 | B2 | * | 3/2005 | Shin ......................... 365/233.13 |
| 2002/0019908 | A1 | * | 2/2002 | Reuter et al. ................... 711/112 |

(Continued)

OTHER PUBLICATIONS

Soltis et al., "The Global File System", Proceedings of the Fifth NASA Goddard Conference on Mass Storage Systems, 1996, pp. 319-342.

(Continued)

*Primary Examiner* — Dinku Gebresenbet
(74) *Attorney, Agent, or Firm* — Lowenstein Sandler LLP (57) ABSTRACT

A cluster file system is disclosed. A plurality of disk servers, operating as a single distributed disk server layer, are connected to the one or more physical disks. Each disk server stores metadata for each of the files. A plurality of lock servers, having one or more locks for each file and associated file system metadata operates as a single centralized distributed lock server to coordinate access to the files stored by the disk server layer. A plurality of asynchronous file servers, operating as a single distributed file server layer in response to a request for a file from a user program: (i) retrieves the requested file from the disk server layer and at least one lock, associated with the retrieved file, from the lock server, and (ii) retrieves metadata for at least one file that is related to the requested files, and at least one lock, for each file that has had its metadata retrieved.

16 Claims, 5 Drawing Sheets

(56) References Cited

U.S. PATENT DOCUMENTS

| | | |
|---|---|---|
| 2004/0117573 A1 | 6/2004 | Sutanto et al. |
| 2005/0044198 A1 | 2/2005 | Okitsu et al. |
| 2005/0097289 A1 | 5/2005 | Burton et al. |

OTHER PUBLICATIONS

Preslan et al., "A 64-bit, Shared Disk File System for Linux", Sixteenth IEEE Mass Storage Systems Symposium held jointly with the Seventh NASA Goddard Conference on Mass Storage Systems & Technologies, San Diego, California, Mar. 15-19, 1999,, pp. 22-41.

USPTO, Office Action for U.S. Appl. No. 11/026,270 dated May 10, 2007.

USPTO, Final Office Action for U.S. Appl. No. 11/026,270 dated Aug. 22, 2007.

USPTO, Advisory Action for U.S. Appl. No. 11/026,270 dated Oct. 17, 2007.

USPTO, Notice of Allowance for U.S. Appl. No. 11/026,270 dated Sep. 30, 2008.

* cited by examiner

METADATA STRUCTURES AND RELATED LOCKING TECHNIQUES TO IMPROVE PERFORMANCE AND SCALABILITY IN A CLUSTER FILE SYSTEM

CROSS REFERENCE TO RELATED APPLICATION

This application is a divisional of U.S. patent application Ser. No. 11/026,270, filed Dec. 30, 2004, now U.S. Pat. No. 7,487,228, which is a continuation in part of U.S. patent application Ser. No. 10/355,786, filed Jan. 3, 2003, now U.S. Pat. No. 7,406,473.

FIELD OF THE INVENTION

This invention relates generally to computer file storage systems, and more particularly to improvements in a file storage system distributed over multiple computer systems that shares disk storage devices on a network.

BACKGROUND OF THE INVENTION

In modern computer systems, large collections of data are usually organized on storage disks as files. If a large number of files exist they may be distributed over multiple disks and/or computer systems. A file system is used to control access to the files by communicating with the various disk drives. Computer programs access the files by requesting file services from one or more file systems. Some file systems also assist with error recovery functions.

In most file systems, the files contain user data and metadata. Metadata is information required to manage the user data, such as names, locations, dates, file sizes, access protection, and so forth. The organization of the user data is usually managed by the user programs.

A cluster file system is one form of distributed file system, where the file servers share access to disk storage devices, communicating with them through a shared disk server layer. The file system data and metadata are stored on the shared disk storage devices. The file servers use a lock protocol to manage accesses to shared files, whereby certain locks must be obtained from a shared pool of locks maintained by a lock server before read, write, or other accesses are allowed to files and file system metadata. To store a larger number of files, additional disks and servers must be added. To simplify the organization of files, groups of files or "volumes" are often manually assigned to particular disks. Then, the files can be manually moved or replicated when components fill up, fail, or become throughput-bound. A cluster file system can reduce management complexity, increase scalability by allowing more servers and shared storage devices to be incrementally added to the cluster, and increases availability by allowing any file server in the cluster to access all files on the shared disks, even in the presence of hardware failures.

One such cluster file system has been developed by Sistina Software, Inc. and is called the Global File System (GFS). This system has been described in a number of publications including: "The Global File System" Proceedings of the Fifth NASA Goddard Conference on Mass Storage Systems by Steven R. Soltis, Thomas M. Ruwart, et al. (1996); and "A 64-bit, Shared Disk File System for Linux" Sixteenth IEEE Mass Storage Systems Symposium held jointly with the Seventh NASA Goddard Conference on Mass Storage Systems & Technologies, Mar. 15-18, 1999, San Diego, Calif. by Kenneth W. Preslan, Andrew P. Barry et. al. all of which are hereby incorporated by reference. In addition, U.S. Pat. No. 6,493,804 issued to Soltis et al., herein incorporated by reference, describes some of the internal metadata structure and operations of GFS.

The Global File System (GFS) is a shared-storage-device, cluster file system. GFS supports simultaneous reads and writes to the file system from different file servers, journaling of read and write operations where each computer (also known as a "node") has its own separate journal, and rapid recovery from node failures. Nodes within a GFS cluster physically share the same storage by means of Fibre Channel (FC), shared SCSI devices, iSCSI, or network block devices (that commonly work over IP networks). The file system is configured so that it appears to reside on each node and will synchronize a file access across the cluster. All GFS nodes can access the shared storage devices and the user data and file system metadata that resides on these shared devices by obtaining and releasing locks associated with these files and metadata. GFS uses read and write caching while maintaining full POSIX file system semantics.

Other cluster file systems are known to those skilled in the art. For example, U.S. Pat. No. 6,173,293, issued Jan. 9, 2001 to Thekkath et al., herein incorporated by reference, discloses a file system that is distributed over a plurality of computers connected to each other by a network. The plurality of computers execute user programs, and the user programs access files stored on a plurality of physical disks connected to the plurality of computers. The file system includes a plurality of file servers executing on the plurality of computers as a single distributed file server layer. In addition, the file system includes a plurality of disk servers executing on the plurality of computers as a single distributed disk server layer, and a plurality of lock servers executing on the plurality of computers as a single distributed lock server to coordinate the operation of the distributed file and disk server layers so that the user programs can coherently access the files on the plurality of physical disks. The plurality of file servers executes independently on a different one of the plurality of computers, and the plurality of file servers communicate only with the plurality of disk servers and the plurality of lock servers, and not with each other. Furthermore, the disk server layer organizes the plurality of physical disks as a single virtual disk having a single address space for the files.

Cluster file systems provide important benefits including scalability, simplified management, and availability. However, from the standpoint of user programs the extra overhead associated with obtaining and releasing locks when accessing files and metadata is purely overhead. This overhead is not seen in traditional non-distributed, local file systems that run on a single computer with only a single file server, where no locking is required between separate computers. In addition, the need to obtain a lock for read and write accesses to files makes it difficult to directly employ some standard performance-enhancing techniques used in non-distributed, local file systems. For example, when files and directories are accessed in a local file system it is useful to read-ahead and access more file system blocks than the current request requires, because a common access pattern is to access a sequence of files in a directory, or a sequence of data blocks associated with the same file. This technique cannot be directly used in a cluster file system because locks must first be taken out on file metadata being accessed.

Another problem in cluster file systems is that in contrast to local file systems that concentrate global state (like quota files) and global statistics (like the results from a file system "df" operation) into one data structure for fast access and update, this centralized state information creates a bottleneck for nodes in a cluster. For example, if the quota file is kept perfectly up to date each time a file is changed, it will be a significant performance and scalability bottleneck.

Extra locking overhead is inherent in cluster file system accesses. If the locking operations are not optimized properly, it will be difficult for a cluster file system to achieve the performance of a local file system.

SUMMARY OF THE INVENTION

The present invention is an improved cluster file system. A plurality of disk servers, operating as a single distributed disk server layer, are connected to the one or more physical disks. Each disk server stores metadata for each of the files. A plurality of lock servers, having one or more locks for each file and associated file system metadata operates as a single centralized distributed lock server to coordinate access to the files stored by the disk server layer. A plurality of asynchronous file servers, operating as a single distributed file server layer in response to a request for a file from a user program: (i) retrieves the requested file from the disk server layer and at least one lock, associated with the retrieved file, from the lock server, and (ii) retrieves metadata for at least one file that is related to the requested files, and at least one lock, for each file that has had its metadata retrieved.

In one embodiment, only a single quota file is used and updated from a node's journal with accumulated information related to each identification numbers current file space allocations. Lock Value Blocks may also be used to cache recent quota file data to avoid global contention for the quota file.

In yet another embodiment, asynchronous lock requests are used to more quickly obtain locks necessary to modify the file system. Lastly, lock requests may be speculatively generated in advance of an actual metadata request to speed processing.

DETAILED DESCRIPTION OF THE PREFERRED EMBODIMENTS

Figure 1:
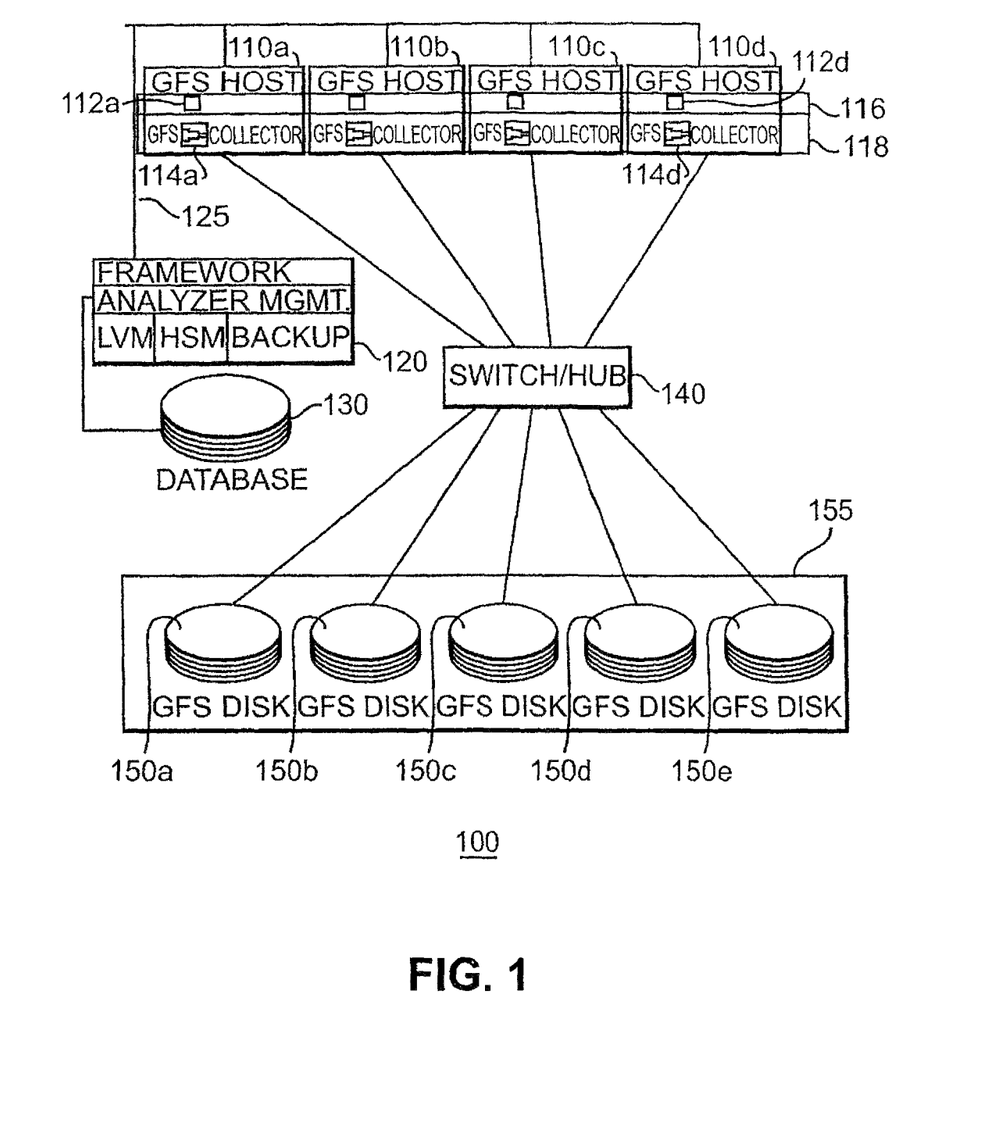
FIG. 1 is a block diagram of a file system constructed in accordance with the present invention.

FIG. 1 is a block diagram of a cluster file system 100 constructed in accordance with the present invention. It is comprised of a plurality of computers (henceforth called nodes) 110, a management node 120 which is connected to a database 130. Each node 110 preferably communicates with management node 120, via a network 125, and at least one switch 140. Switch 140 is connected to one or more disk servers 150. In the preferred embodiment, host 110 is a general-purpose computer. Those skilled in the art will recognize that switch 140 could be replaced with a hub or a router.

In the preferred embodiment, disk servers 150 are connected to the one or more physical disks (not shown) and operate as a single distributed disk server layer 155 having one or more address spaces. Each disk server 150 also stores metadata, that is summary information about the file and the file system, for each of the files stored in the disk server layer 155. The metadata is preferably created and updated when the file is written to one of the disk servers 150 and when changes are made to the file system.

In the preferred embodiment, each host 110 is a general-purpose computer, having a memory, that executes a file server 112 and possibly a lock server 114. Each lock server 114 has at least one or more read locks and one or more write locks for each file and locks for file system metadata and other shared objects stored in the disk server layer 155. One or more lock servers 112 operate as a single centralized or distributed lock server 118 to coordinate access to the files, file system metadata, and other shared objects stored by the disk server layer 155. A computer executing a lock server may optionally mount a GFS file system and execute a file server, or it may simply execute the lock server and no file server. The lock server (known as the master) can run in a hot standby mode with two or more additional computers (known as the slaves) keeping track of current lock server state, so that if the master lock server fails one of the standby lock servers can continue the lock server operations without interrupting file server operation. Two additional slaves are needed to use quorum techniques to determine new lock server masters after a lock server failure, even in the presence of network splits. The GFS lock space can be partitioned between several lock masters which can, along with their associated lock server slaves, act as file servers as well.

Each host 110 coordinates its efforts such that the files servers 114 operate as a single distributed file server layer 116 and the lock servers operate as a single centralized or distributed lock server 118 so that in response to a request, from a user program executing on host 110, for a file stored a physical disk associated with a disk server layer 155, the file server 112, on host 110, receiving the request from the user program: (i) retrieves the requested file from the disk server layer 155 and at least one lock, associated with the retrieved file, from the lock server 118, and (ii) retrieves metadata for at least one file that is related to the requested files, and at least one lock, for each file that has had its metadata retrieved. The retrieved lock and metadata are preferably stored in the memory of each host 110.

The file system 100 caches file system data and metadata in node memory to improve performance by reducing the number of physical disk operations that must be performed, even though the this means that the file system metadata on-disk is not the same as that in node memory and is often inconsistent (i.e., incomplete file system operations leave the on-disk version of the file system without a completely updated version of the file system state.) Because node failures (e.g., a power supply failure) result in lost file system metadata, inconsistent on-disk metadata must be repaired by an off-line file repair program which is time-consuming. An alternative approach taken by the file system 100 in the preferred embodiment is to keep a journal (sometimes referred to as a "log") of each change to the file system metadata. A journal entry consists of all the metadata operations that move the file system from one consistent state to another. For example, a "create" file operation must change a bit-map field to indicate a new inode is to be allocated, modify the inode blocks representing both the new file and the directory into which the new file will be placed. All three of these file systems changes associated with a create must successfully complete for the file system to transition from one consistent state to another; hence, the journal entry for the create operation will include all three operations in its create transaction. Each change to the file system consistent state will involve a new entry in the journal, which keeps these entries in a list with both a head and tail. As metadata for each file system operation is written from node memory to the in-place file system metadata on disk, the journal entry associated with the operation can be removed from the journal. Hence, the journal effectively keeps a log of transactions (which move the file system from one consistent state to another) for file system operations that have completed but have not had their metadata completely written to disk. If a node crashes the log can then be re-played, with each transaction in the journal being executed atomically in sequence so that, once the complete journal has been written to disk, the file system is once again consistent.

In the preferred embodiment, the file system 100 journal can optionally include the data associated with each file system operation, so that the journal is both a metadata and data journal, or only the metadata can be journaled. Also, better performance can be achieved if each node executing a file server has its own journal; in contrast, in a cluster file system design with only a single journal that journal will become a bottleneck. A generation number can be added to insure that each distinct metadata change entry in the journals is ordered with respect to all other metadata changes. The generation number is kept in the in-place metadata as well; each metadata change causes the generation number to be incremented. Before a journal entry is replayed, the generation number of the in-place metadata is tested to determine if it is equal to or greater than the generation number in the metadata change journal entry. If so, there is no need to replay this journal entry.

Figure 3:
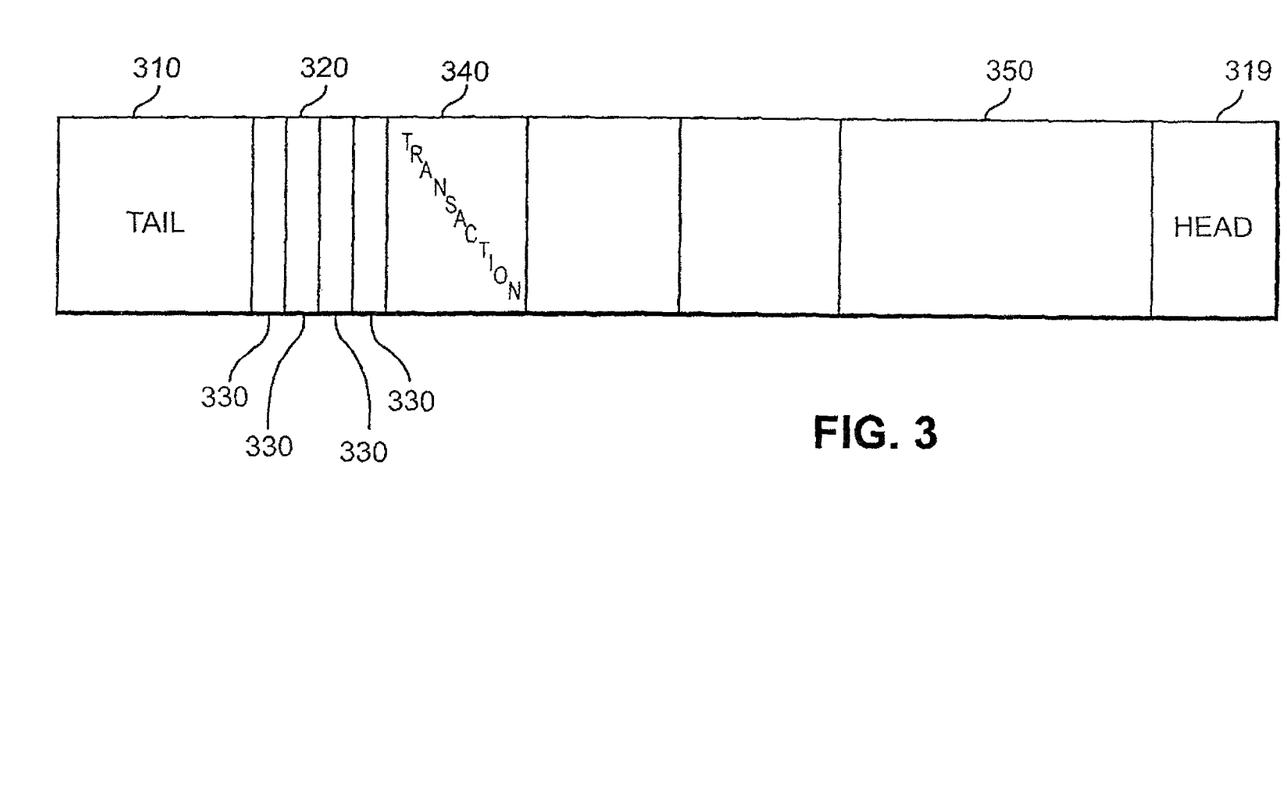
FIG. 3 is a block diagram of a GFS journal entry according to the present invention.

Referring now to FIG. 3, thereshown is a block diagram of a GFS journal entry 300 for a specific transaction according to the present invention. The journal entry 300 includes tail 310, metadata blocks 330, transaction 340, data 350 and head 319. The head 319 identifies the start of a new journal entry. The data 350 is data associated with each file system operation. Transaction 340 is information including generation number and tags for this transaction. The metadata block 330 includes information about the information stored in the journal entry 300. Tail 310 signals the end of the journal entry.

Figure 4A:
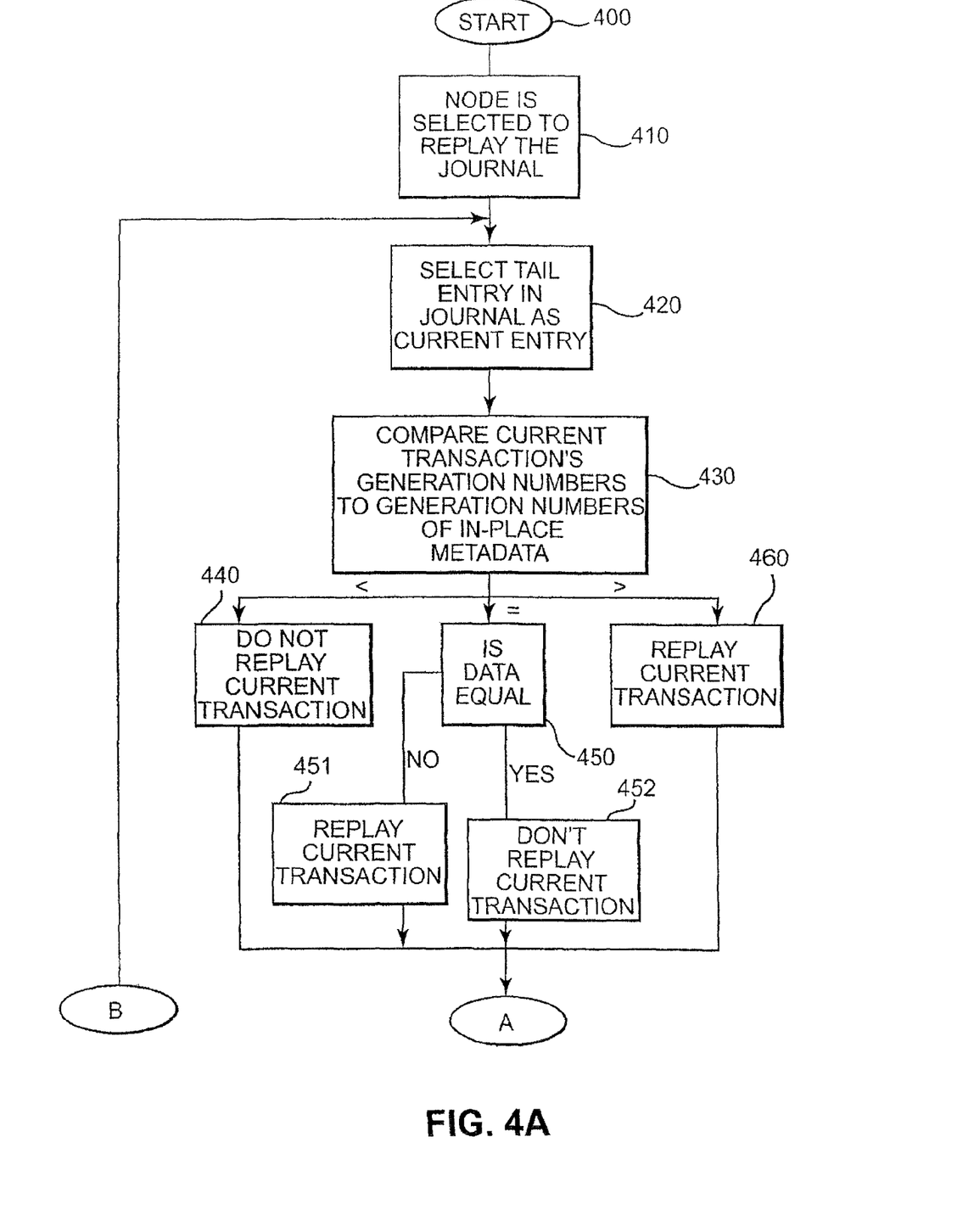
FIGS. 4A and B are a flow chart of the journal replay process according to the present invention.

In FIG. 4A, thereshown is a journal replay process. After starting at block 400, the process selects a node to replay the journal at block 410. Then, the process selects a tail entry in the journal as the current entry at block 420. At Block 430, the process compares the current transaction's generation number to the generation numbers of in-place metadata.

Figure 4B:
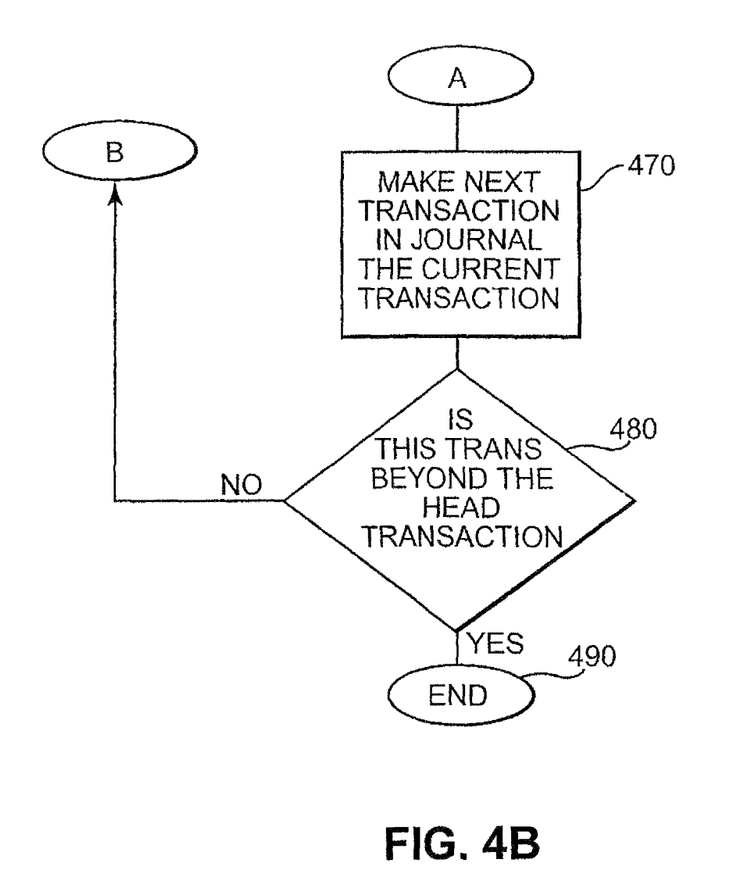

If the current transaction generation number is less than the in place generation number, the process advances to block 440 where the process does not replay the current transaction. If the current transaction generation number is equal to the in place generation number, then the process advances to block 450 where the process determines if the data in place in the file system is the same as the data in the transaction. If the data is not equal, then the process advances to block 451 where the current transaction is replayed. If the data is equal, then the process advances to block 452 where the process does not replay the current transaction. If the current transaction generation number is greater than the in place generation number, then the process advances to block 460 and the current transaction is replayed. In any of these cases, the process then advances to block 470.

In block 470, the process makes the next transaction in the journal the current transaction. The process then moves to block 480 where the process determines whether the current transaction is beyond the head transaction. If not, then the process returns to block 420 and repeats. If so, the process moves to block 490 and ends for this set of transactions.

File system 100 operations that change file system metadata and hence result in journal entries include but are not limited to write (write to a file), truncate (reduce the size of a file), rmdir (remove a directory), mkdir (make a directory), create (create a file), and unlink (remove inode from directory).

In the preferred embodiment management node 120 allows file system 100 to be managed as a single system using a shared system image. The infrastructure may be managed from management node 120 from either a standard command line interface (which allows for scripting) as well as a sophisticated Graphical User Interface (GUI) management framework. The management framework allows information to be plugged into network management software based upon standards like SNMP, including Tivoli, CA Unicenter, and user interfaces provided by other vendors.

Providing a GUI interface allows less experienced system administrators to efficiently work with the file system 100 of the present invention. In addition, in the preferred embodiment the GUI tools generate scripts based upon a sequence of GUI commands, which can be re-used by the users to instantiate multiple storage cluster installations.

In the preferred embodiment, the GUI interface of management node 120 integrates all major pieces of GFS cluster file system management—cluster file system, volume manager, and backup—into a single, tightly-integrated framework. Of course, those skilled in the art will recognize that a stand-alone GUI interface can be optimized for particular applications, including NAS clusters (based on the NFS and CIFS protocol), web server clusters (based on ftp and http), and email server clusters.

In addition, management node 120 allows reconfigurations of distributed file system 100 (such as kernel upgrades, adding or deleting new storage devices and volumes, and re-sizing of the cluster file system) can be quickly and easily accomplished while file system 100 is in use. Management node 120 is also designed to allow the integration of cluster volumes on- and off-line, and to integrate these new volumes into existing cluster file systems.

Management node 120 also provides functionality that allows rolling upgrades of the OS kernel of host 110 and disk servers 150 to be performed. This makes it possible to add servers, storage, and network units independently while the system is operational and on-line.

File system 100 will survive and transparently route around faults in the file servers, lock server masters, HBAs (host bus adapters), storage area network switches, and disk arrays. Multi-pathing through multiple HBA paths and switch routes, as well as storage array controller fail-over is supported. Fail-over of server applications (services like email, NFS, CIFS, http, ftp, databases, etc.) can be transparently used without interrupting the current operation of the system. When applications fail-over to another file server, it is not required to re-mount the underlying shared volume and GFS file system, because the file server to which the applications are migrating can already have the shared volume and file system mounted. This approach makes it possible to fail applications over more quickly compared to systems where only one file server at a time may mount the file system and its underlying disk storage.

The present invention allows application load balancing across servers and storage devices in an intrinsic and transparent manner. Server application load balancing (services like email, NFS, CIFS, http, ftp, databases, etc.) is also an intrinsic and transparent part of the system.

The present invention allows a completely integrated solution (cluster file system, cluster volume manager, and clustered backup), yet components of the system are interoperable with other cluster and storage system software and hardware. The components are modular so that different components can be used independently (i.e., it is not monolithic, but the components can be cleanly integrated together).

File system 100 supports fast, efficient LAN-free backups. Any file server or group of file servers in the cluster can act as a backup server to a tape device that is either directly attached to that server or attached to the same SAN as the disk servers. Parallel backups (where multiple backup servers can operate simultaneously) and cluster snapshots (these are snapshots of the file system or volume state that work across all nodes in the cluster) are supported to increase performance and reduce the overall time required for backups of large systems. Snapshots of the GFS file system can be taken after it is quiesced and its data and metadata synchronized back to disk from the file server memory. These snapshots provide a consistent view of the file system state. Backups support clean recovery and restart of the backup process when servers or tapes fail during backup or recovery: such backups will be referred to as clustered backups. In addition, a dump and restore capability is provided for improved performance and accuracy of the system backup. Backups can also be executed across parallel servers in the cluster to improve performance, thus allowing an integrated cluster file system, volume manager, and backup platform. Snapshots at both the file system and volume manager level are also provided, so that backups and restores can proceed simultaneously with the regular system workload.

The storage systems software is independent of the storage networking hardware. The present invention operates on a variety of storage networks including Fibre Channel, Infiniband, or IP-based storage area networks using technologies like GNBD (Global Network Block Device).

Extended attributes are also provided. These allow file system 100 to tag files and directories with metadata related to access privileges, file usage and modification, allowed services, and other cluster-relevant information. By integrating these extended attributes with LDAP, an enterprise-wide, open directory service, a comprehensive, powerful storage management tool can be created.

File system 100 provides: monitoring, alerting, and reporting on the storage infrastructure (devices, switches, HBAs, and servers); precise information on storage utilization across the enterprise for capacity planning and cost accounting for storage usage; and data analysis and decision support to enable best practices in storage management.

Additional details concerning the various implementations of the present invention are also described in U.S. patent application Ser. No. 10/355,786, filed Dec. 22, 2003 herein, incorporated, in its entirety, by reference.

Management node 120 utilizes a software framework that accepts add-on modules and/or plugins to provide additional functionality to the base framework. The software framework will automatically handle the presentation and organization of the information presented by the modules/plugins and provide a consistent user interface (UI).

Management node 120 performs operations like creating windows, pop-up dialogs, selection lists, menus, etc via a defined API. Inheritance of base functionality and look/feel of modules are extensively used to keep from replicating work (to include creation, testing, and verification). The software elements of management node 120 act together to present an integrated application/environment to the user. Additional functionality is provided via plug-ins (flash, shockwave, encryption, pdf, audio, video, etc).

Management node 120 provides a number of functions including: adherence to appropriate UI standards; a unified API for creating GUI objects; adherence to industry standards for gathering device specific information (SNMP, SLP [service location protocol], CIM) when appropriate and feasible; a unified and extendable API for integrating product information in to the framework; a unified and extendible API for instantiating control and query actions against integrated third-party products; the ability to "script" sequences of operations in the appropriate management and performance modules (i.e. Install, Performance). In addition the modules shall be capable of executing as standalone programs.

The present invention also uses a framework and associated modules that utilize LDAP whenever possible for storing, querying, and/or manipulating information. In scenarios where this is not possible (i.e. application and/or function can not utilize LDAP functionality) the information shall be stored in an appropriate manner for the application/module and in the LDAP database as well. This provides a single point for querying information, as well as, a mechanism for recovering corrupted/lost data.

In an alternate embodiment, the present invention may use either a framework and associated modules capable of: utilizing remote database instances via standardized methods (i.e. JDBC); secure control mechanisms to instantiate changes upon either a single node or multiple nodes within the GFS cluster, via mechanisms like "ssh" and "gsh—the old, perl global shell" or "cfengine"; or a frame work that requires a common reference clock. In the preferred embodiment, all nodes shall run "ntp" with the same master server. The master server may be one of the nodes in the GFS cluster as long as all other nodes are "peers".

Figure 2:
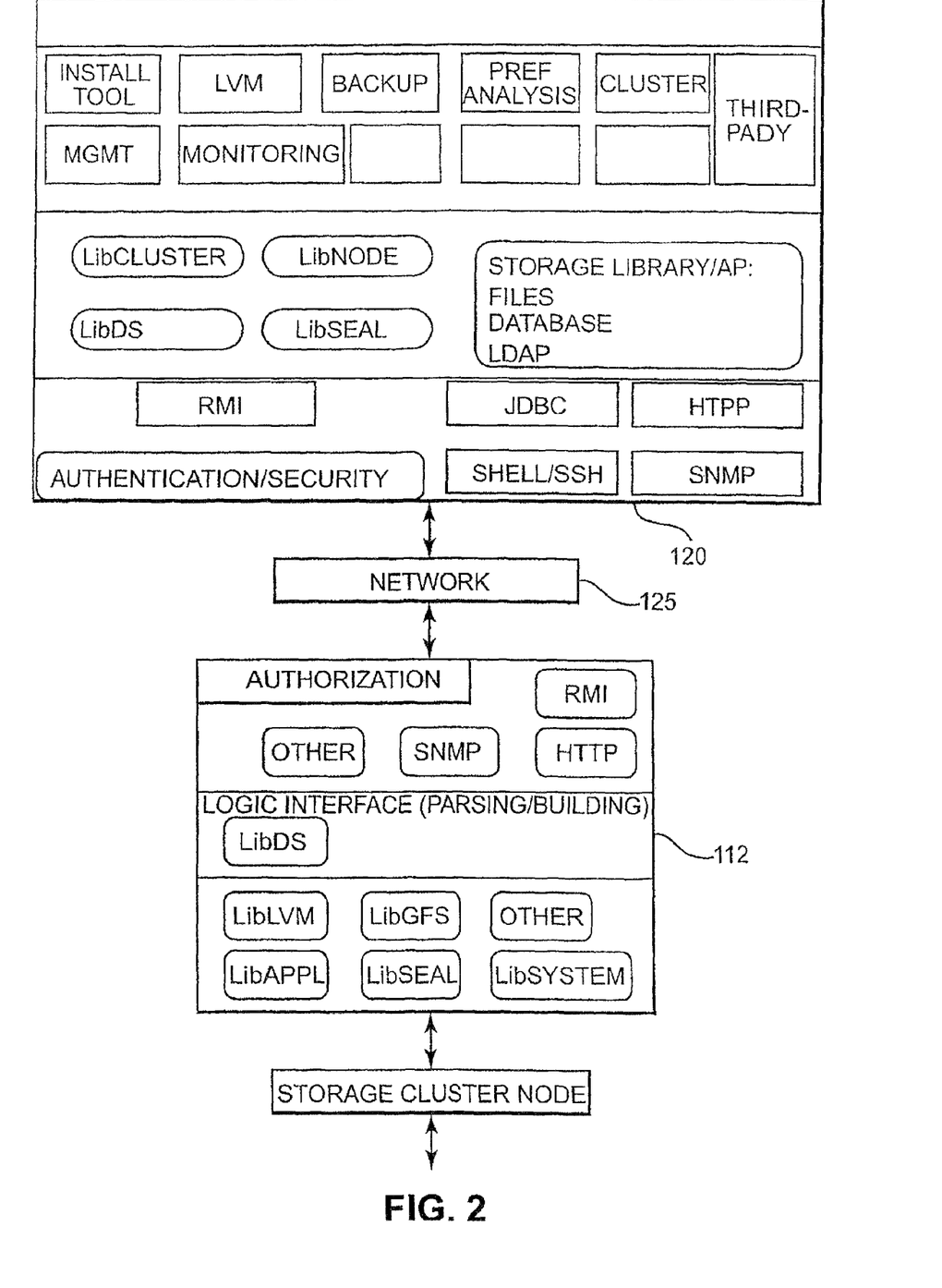
FIG. 2 is diagram depicting the management node of the present invention.

FIG. 2 provides additional detail concerning the structure of the present invention. Specifically management node 120 communicates via a network 125 with file server 112.

The actual GUI management framework, framework plugins, and standalone programs/utilities related to management ran on the Management node 120. It is not a requirement that the management node be directly connected to any of the file servers 112 or have the ability to access any of the storage devices under its control. Management node 120 accomplishes management/query actions via a proxy to the file server 112. The proxy is a daemon running on each of the hosts 110. If management node 120 has direct access to the storage network or storage devices it may accomplish management/query actions without involving the proxy. The rationale behind such a scheme is to allow flexibility in determining where the management framework is ran (i.e. administrators notebook, administrator's desktop, server node, storage cluster node).

Management node 120 also has the ability to query/update the cluster infrastructure database directly as a result of management/query actions performed on the storage cluster. Cluster wide actions are initiated from management node 120 by utilizing a unifying library called "libCLUSTER". libCLUSTER will communicate cluster actions to the storage cluster nodes via appropriate authentication and communication libraries. Examples of cluster wide operations are: quiecse I/O operations to a GFS filesystem; unmount a GFS filesystem from an entire storage cluster; mount a GFS filesystem from an entire storage cluster, determine active storage cluster nodes in a particular GFS filesystem; determine active GFS filesystem in a storage cluster.

In the preferred embodiment, management node 120 utilize standard authentication, communication, and persistent storage libraries (files, LDAP, database) to accomplish communication between hosts 110 and the appropriate cluster infrastructure mechanism. Management node 120 has the capability of utilizing libSEAL for storage discovery actions is it is connected to the SAN. Otherwise, libSEAL actions are accomplished via a proxy. This is the most likely scenario since multiple GFS storage clusters may be managed via the framework.

In the preferred embodiment files system 112 is comprised of an Agent Daemon running on every storage cluster node handles authentication, communication, and parsing of requests received from the management framework node. Node specific operations are performed via libGFS, libLVM, etc. . . . . Node information not encoded in specific application libraries (libGFS, libLVM, libAMANDA, etc.) is handled via a more generalized library (libNODE); and a SNMP (UCD SNMP) is utilized when appropriate. This is useful for query actions vs. management actions which require authentication and authorization.

In the preferred embodiment, cluster infrastructure is comprised of the CIDEV—physical disk partition; LDAP and a direct database (such as Oracle).

In instances where helper libraries implement functionality via wrappers for Core Technology command line interfaces (CLIs) the wrappers should implement at a minimum: Validation of arguments for correctness and safety; Allocation and composition of the appropriate CLI instance based upon the validated parameters provided; Execution of the CLI command via an appropriate system call (i.e. system( )) or security mechanism; and check return codes and take appropriate actions based on them.

The Quota Administration Module (QAM) provides the ability to administer, monitor, and report on quotas for a specified filesystem as further described in U.S. provisional application of U.S. patent application Ser. No. 10/355,786, filed Dec. 22, 2003. The Present invention allows the administrator to limit the amount of disk space each user the consumes. The administrator sets these "quotas" and the filesystem prevents the user from allocating more disk space than they're allowed.

The quota implementation of the present invention will support fuzzy quotas. When all the quota changes to a particular user identification number (UID) or group identification number (GID) happen on one node, that one machine has all the information necessary to accurately enforce the quota limit on the user. When multiple nodes are doing allocations and de-allocations on the same identification number (ID, which can be a UID or a GID), the current value of the number of blocks allocated to that UID or GID will be stored fuzzily, i.e., it will closely (how close is under system administrator control) approximate but not be an exact representation of the quota value. Also, the value isn't guaranteed to be absolutely consistent across the cluster, but it will be "mostly" right.

Quotas are transactional—each file allocation or de-allocation is a transaction that includes the file system data and metadata blocks that were modified by the transaction and one or more quota changes to the ID's quota value. These quota values are kept in a single quota file used by each GFS file system. The quota file transactions are committed into a node's journal atomically. That way if the machine crashes, the quotas in the quota file are consistent after journal replay and no quota checker program has to be run after a node crashes.

The present invention implements quotas in a different way than the prior art. An allocation transaction in most non-cluster file systems that are implemented on a single node with its own dedicated physical disk (e.g., in the Linux operating system such file systems include ext3fs, Reiserfs, and XFS and are often referred to as "local" file systems as opposed to distributed file systems) will include the actual changes to the quota file as part of the transaction. Hence, every transaction that does an allocation or de-allocation causes an immediate change to the quota file. In GFS, this would become a severe bottleneck. Every transaction on every machine in the cluster would be trying to modify one resource: the quota file. To avoid this bottleneck, GFS adds quota change tags to each transaction related to the quota file and those tags are accumulated in each machine's journal. Periodically, they are copied out of the journal and into the quota file. With this approach, each allocation or de-allocation changes only local quota data, and the quota file is changed only asynchronously. Each node periodically wakes up a quota kernel thread and sums the quota data (kept in memory) and writes the new value to the quota file.

The mechanism used to implement fizzy quotas using LVBs can be generalized as a means of collecting, updating, and providing sampled data points from the cluster entity (including but not limited to system performance counters, file system counters, volume management counters and system statistical utilities like "df", "du", and "stat") which can be maintained with varying degrees of accuracy dependent on the amount of system or file system overhead. Allowing these collected samples to be less accurate (i.e. "fuzzy") permits the file system or underlying operating system to operate in a more efficient manner.

In addition to delaying updates to the central quota file, the current quota data (limits and current values) are cached in Lock Value Blocks (LVBs) for each ID. LVBs are additional memory (in the case of GFS, 64 bytes) associated with each lock being used by the file servers. Each node manipulating an ID (by creating, deleting, growing, or shrinking files associated with that ID and hence allocating and de-allocating block space for these files) acquires a shared hold on the ID's lock. Each ID is a shared object (ID name space) within the GFS system that has locks associated with it. It can then do the comparison of the current usage value and the limit without having to be constantly reading the quota file; the quota data that must be read is cached in the ID lock's LVB. The data in the LVBs is updated when the corresponding ID is updated in the quota file—so the LVBs always represent what's in the quota file, and not any changes that have happened in the journals since. The LVB's act as a distributed, fast, locally-cached, mostly-read version of the quota file that can be quickly accessed by each node in the GFS cluster.

Since quotas are fuzzy, it's possible for a user to overrun his quota and use more file system space than allowed by his quota. It's worthwhile to limit how much the overrun can be, however. Each machine knows the current quota data in the quota file (by looking at the contents of the ID's LVB), the amount of space allocated by that node that hasn't been copied into the quota file, and the number of machines in the cluster. Each node assumes that it can allocate up to 1/n'th (where n is the number of nodes in the cluster) the unallocated space remaining for a particular ID. A node can use this information to figure out how often the quota changes should be written to the quota file. As the portion of the unused allocation for a particular ID shrinks, then the 1/n'th fraction of that unused allocation gets smaller for each node. Each time this portion of the unused allocation is used up, the local quota information for that node is written to the quota file. Hence, the closer the ID is to its limit, the more often the changes are synced to the actual quota file and LVBs.

Asynchronous Lockahead

Several procedures can be implemented to increase operating performance of a cluster file system like GFS, including asynchronous locking and metadata read-ahead.

When doing operations that traverse directory trees in GFS, the majority of time is spent waiting for reads from the disk. The traditional way of minimizing this time is to do read-ahead on inodes and other metadata. It's problematic to do standard file system read-ahead in GFS because neighboring blocks aren't necessarily protected by the same lock.

The solution is to add asynchronous locking to GFS. When GFS reads metadata it can begin sending out asynchronous lock requests in advance of the actual request for the metadata associated with that lock. For example, for a readdir operation to a directory, it can start sending out asynchronous requests to acquire the locks for the inodes in that directory. In a traditional synchronous lock request, a lock request operation begins with a file server sending a lock request to a lock server. The file server blocks all further operations until the lock request is processed by the lock server and information is returned to the file server that indicates if the lock request has been granted or denied. Further file server processing can then resume. In contrast, an asynchronous lock request from a file server allows the file server to continue operating immediately after the lock request is sent out to the lock server. These asynchronous lock requests can use a "Try" attribute, which means that an attempt is made to obtain the lock but if the attempt fails a request is not queued at the lock server. The notification routine that lets GFS know that an asynchronous lock request has succeeded can then send an asynchronous read request for the inode block protected by that lock. In this way, we get the advantages of a local file system's read-ahead without violating the system locking constraints.

This approach can be extended by sending off a plurality of asynchronous lock requests in parallel from a single file server. Each plurality of lock requests could include all the locks required by a particular file system operation, including but not limited to readdir, stat, rename, link, rmdir, write, unlink, truncate, and inode de-allocation. In this way, all the locks needed for a particular file server operation can be requested at almost the same time, reducing the overall time required to acquire all the locks necessary for an operation. The alternative approach is to send one lock request, wait for the lock server to respond, then if the first lock is granted, send out the next lock request, and so on. Each lock operation must wait for the previous operation to complete. In contrast, sending off a plurality of asynchronous lock requests allows these operations to be completed in parallel reducing the total amount of time required for processing lock requests. All locks in the plurality of asynchronous lock requests must be granted for the file system operation (including but not limited to readdir, stat, rename, link, rmdir, write, unlink, truncate, and inode de-allocation) to be processed; if one or more of the asynchronous lock requests fails, the file server must sort the requests and do them sequentially in order.

It is possible to speculatively execute asynchronous lock requests such that a lock request is performed even though there is no corresponding need for the metadata associated with that lock. The file server can use internal information including but not limited to previous metadata access patterns, knowledge of the current list of file system operations being executed, and hints from user-level applications. Beginning a lock request speculatively before the actual request for the associated lock and metadata has occurred can reduce overall lock request latencies if speculative requests happen early enough to hide a significant portion of the lock latency, and if the additional overhead of speculative requests that are not actually required by the file server do not increase the processing times for truly necessary lock and metadata requests.

Every change to the file system generates an event that can be logged into a database external to GFS. That database can then be queried. This is useful at backup time because the whole (possibly very huge) file tree structure doesn't need to be scanned. In addition, file accesses can be logged so that at all times its possible who accessed a particular file, directory, or file system at any point in time in the past.

A cluster file system can utilize context-dependent path names to create unique, per-node subdirectories within a shared file system tree. The context specific directories can be based on a arbitrary tag such as: IP Address, Node Name, User ID, Group ID, Node Architecture, or other such distinct name spaces. By utilizing a tag specific to a Node (i.e. IP address or Node Name), a separate boot subdirectory can be created for each node. This approach simplifies the process of creating a single boot (e.g. root file system) for a plurality of nodes.

Most operating systems do not provide a mechanism to prevent a system administrator with root access i.e., permission to read or modify any file or system setting) from changing a file or file system. Hence, in the event of some kind of security breach where the exact state of the file system must be preserved, it is difficult or impossible to guarantee this occurs. A file system can use a licensing mechanism that allows system administrators and users to have read access to a file system, but prevents any writing or modification of the file system if the license is no longer valid.

One possible way to use this mechanism is to populate a file system with a valid license installed. As a security mechanism, now insert an invalid license. This invalid license will now cause the cluster to fall back to a read-only mode for the file system (regardless of how it was mounted.) At this point, the data in the file system can not be changed without an appropriate license.

All patents, patent applications and other documents or publications mentioned herein are hereby incorporated by reference.

In the foregoing description, for purposes of explanation, numerous specific details have been set forth in order to provide a thorough understanding of the present invention. It is important to understand that the present invention may be practiced with some or all of these specific details. Those skilled in the art will recognize modifications and alterations upon a reading and understanding of this specification. The present invention is intended to include all such modifications and alterations insofar as they come within the scope of the appended claims or the equivalents thereof.

We claim:

1. A method comprising:

recording, by a first server device of group of server devices operating together as a single distributed file server layer for a file system, a first change in usage of a resource of the file system at a first time, the first change recorded as a first quota change tag;

recording, by the first server device, a second change in the usage of the resource at a second time later than the first time, the second change recorded as a second quota change tag;

subsequent to the second time and not in a time interval between and comprising the first time and the second time:

updating, by the first server device in view of both of the first quota change tag and the second quota change tag, a quota file shared by the group of server devices to track the usage of the resource; and storing, by the first server device in a lock value block (LVB) corresponding to an ID of the resource and separate from the quota file, data for the resource from the updated quota file, wherein the LVB is referenced by the group of server devices to compare the usage of the resource to a quota limit for the resource that is also stored in the LVB corresponding to the resource.

2. The method of claim 1 wherein the quota file stores a plurality of quota values, and wherein each of the quota values is associated with a respective set of one or more users.

3. The method of claim 1 further comprising caching quota file data.

4. The method of claim 1 wherein the resource is disk memory, and wherein the first change is a result of one or both of a file allocation and a file de-allocation.

5. The method of claim 1 wherein the first change in the usage of the resource is a result of a transaction.

6. A server device comprising:
a memory; and
a processor communicably coupled to the memory, the processor to:
cooperate with other server devices as a group of server devices to provide a single distributed file server layer for a file system;
record a first change in usage of a resource of the file system at a first time, the first change recorded as a first quota change tag;
record a second change in the usage of the resource at a second time later than the first time, the second change recorded as a second quota change tag;
subsequent to the second time and not in a time interval between and comprising the first time and the second time:
update, in view of both of the first quota change tag and the second quota change tag, a quota file shared by the group of server devices to track the usage of the resource; and
store, in a lock value block (LVB) corresponding to an ID of the resource and separate from the quota file, data for the resource from the updated quota file, wherein the LVB is referenced by the group of server devices to compare the usage of the resource to a quota limit for the resource that is also stored in the LVB corresponding to the resource.

7. The server device of claim 6 wherein the quota file stores a plurality of quota values, and wherein each of the quota values is associated with a respective set of one or more users.

8. The server device of claim 6 further comprising caching quota file data.

9. The server device of claim 6 wherein the resource is disk memory, and wherein the first change is a result of one or both of a file allocation and a file de-allocation.

10. The server device of claim 6 wherein the first change in the usage of the resource is a result of a transaction.

11. The method of claim 1, wherein the quota file stores a fuzzy quota.

12. The method of claim 1, wherein the time interval between and comprising the first and second times is determined in view of an unused allocation of file system space of the first server.

13. The method of claim 12, wherein the time interval dynamically changes as the unused allocation of the file system space changes.

14. The server device of claim 6, wherein the quota file stores a fuzzy quota.

15. The server device of claim 6, wherein the time interval between and comprising the first and second times is determined in view of an unused allocation of file system space of the first server.

16. The server device of claim 15, wherein the time interval dynamically changes as the unused allocation of the file system space changes.

* * * * *